United States Patent [19]

Schutz

[11] Patent Number: 4,478,453
[45] Date of Patent: Oct. 23, 1984

[54] ADJUSTABLE COVER FOR INFANT CAR SEAT

[75] Inventor: Bernard R. Schutz, New York, N.Y.

[73] Assignee: Fine Art Pillow & Specialties Corp., New York, N.Y.

[21] Appl. No.: 344,366

[22] Filed: Feb. 1, 1982

[51] Int. Cl.³ .............................................. A47C 31/10
[52] U.S. Cl. ..................................... 297/219; 297/224
[58] Field of Search ................. 297/219, 224, 229, 228

[56] References Cited

U.S. PATENT DOCUMENTS

| | | | |
|---|---|---|---|
| 1,857,418 | 5/1932 | Wedler | 297/219 |
| 4,188,065 | 2/1980 | Meeker | 297/219 |

FOREIGN PATENT DOCUMENTS

| | | | |
|---|---|---|---|
| 449962 | 7/1948 | Canada | 297/219 |
| 2399223 | 4/1979 | France | 297/229 |
| 439033 | 11/1935 | United Kingdom | 297/219 |
| 1143275 | 2/1969 | United Kingdom | 297/219 |

Primary Examiner—Francis K. Zugel
Attorney, Agent, or Firm—James & Franklin

[57] ABSTRACT

The cover has front and rear sections joined along the top to form a recess into which the upper part of the back and the forwardly extending sides (if present) of the infant car seat are received. The rear section has spaced first portions partially defining the ends of the recess. Each first portion has a set of outwardly extending, spaced connecting strips to permit alteration of the effective size and shape of the respective recess ends. If no forwardly extending sides are present, the strips interconnect to fold each of the first portions over itself and hold some adjacent the rear of the seat. A second portion, situated between the first portions, has differently spaced pairs of interengaging snaps for altering the effective length thereof. An elastic strip, situated along the edge of the rear section, permits expansion of the recess to facilitate mounting of the cover and to maintain the edge of the rear section adjacent the back of the seat.

7 Claims, 11 Drawing Figures

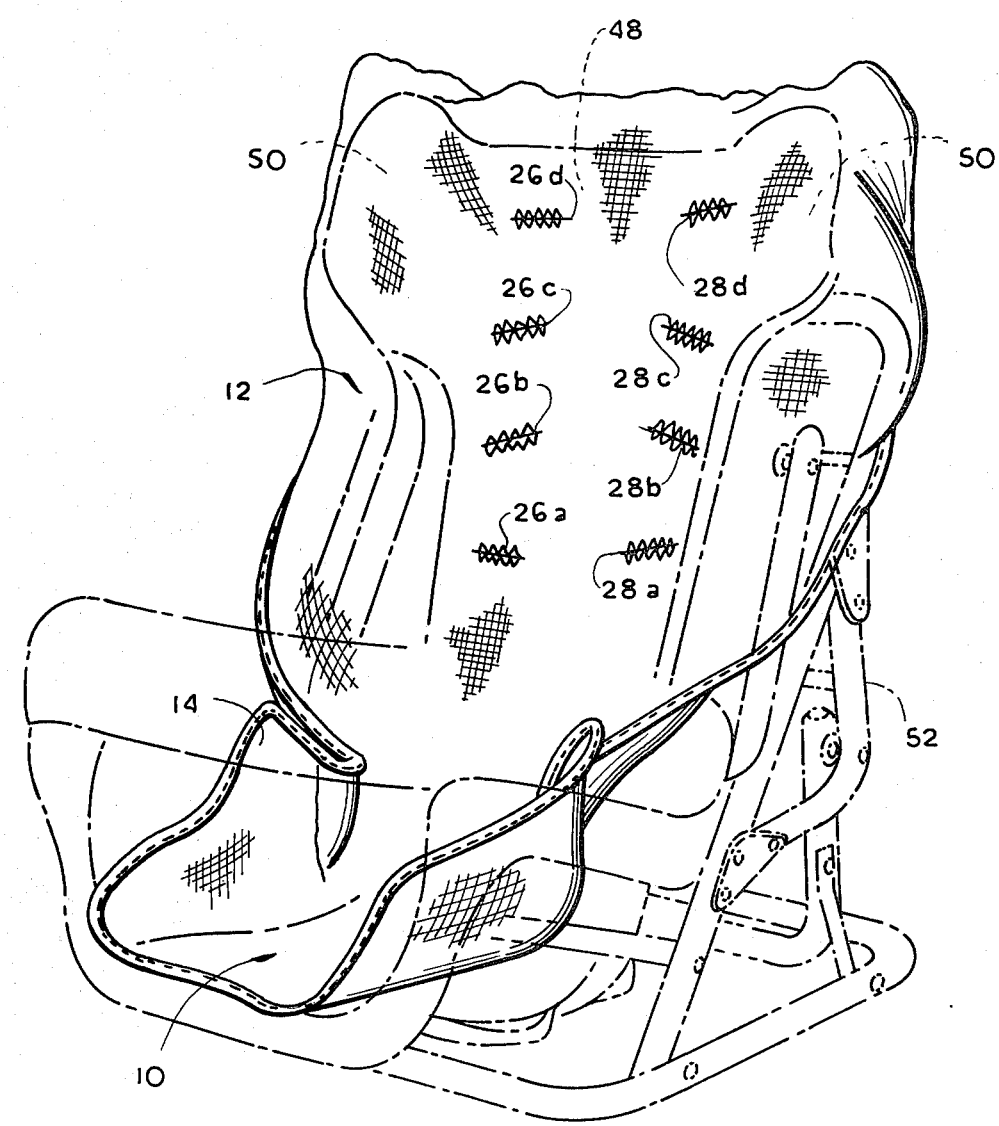
F I G. I

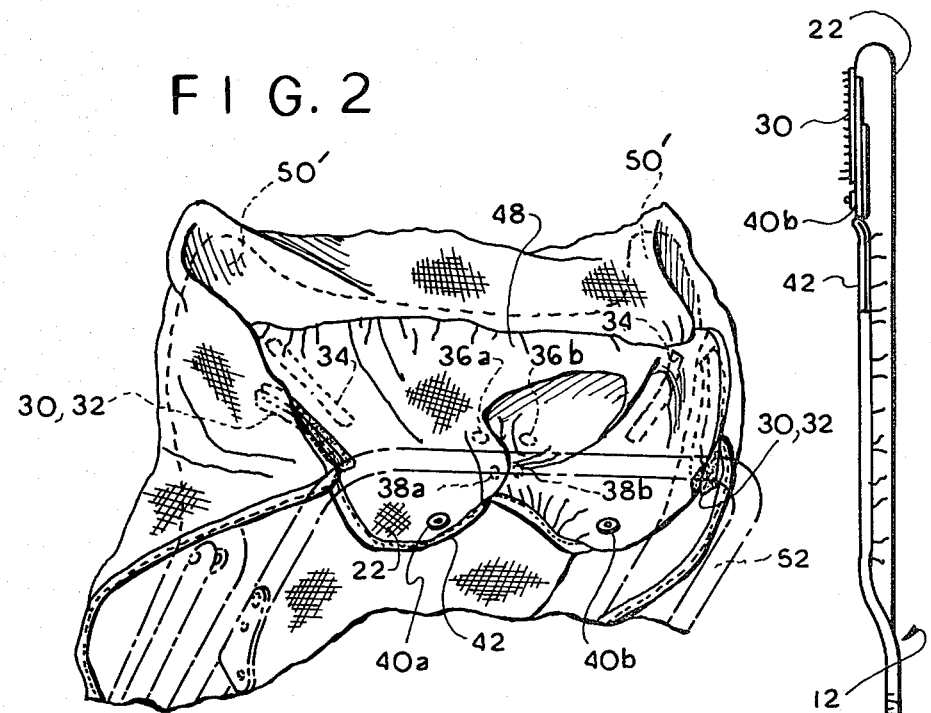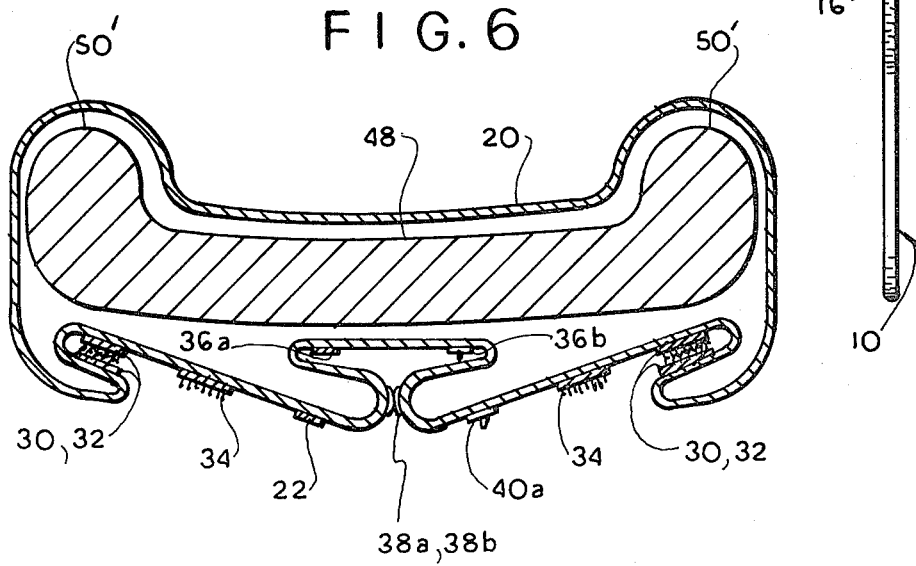

ADJUSTABLE COVER FOR INFANT CAR SEAT

The present invention relates to covers for infant car seats and, more particularly, to a cover designed for use with infant car seats of a variety of different sizes and shapes.

Because of the large number of automobile accidents in which infants are seriously wounded or killed, many safety experts recommend that infants travelling in automobiles be placed in specially designed infant car seats. Such infant car seats are designed to protect the infant by reducing the possibility of injury in the event of an accident. The infant car seats are provided with structure which enables the infant seat to be affixed to the seat of the automobile, preferably the rear seat thereof. Straps, which can be fastened around the infant, are provided to retain the infant in the seat. In the event of an accident, the movement of the infant is severely restricted, such that the possibility of the infant flying through the windshield or smashing against the dashboard is greatly reduced.

The infant car seats are produced and sold by a number of different manufacturers and come in a variety of different sizes and shapes. Many larger seats have enlarged and cushioned upper back and side portions for neck protection. Smaller seats usually have a straight back with no forwardly extending sides. There are also many design and size variations between these extremes.

Many of the infant car seat manufacturers utilize a plastic or vinyl covering over the upholstered portion of the infant seat for sanitary and durability reasons. However, such plastic or vinyl coverings tend to be uncomfortable, particularly to the sensitive skin of an infant. In the summer, particularly if exposed to direct sun light, such materials become extremely hot and sticky. In the winter, these materials become uncomfortably cold. Moreover, the plastic and vinyl covering is not soft to the touch and cannot be removed for purposes of washing.

As a result, infant car seats are often utilized with a soft fabric cover which is designed to be mounted on the seat and fit the contours thereof. The cover is provided with openings through which the straps extending from the seat may be inserted, such that the infant is still reliably retained by the seat. Fabric covers of this nature solve the problems of the plastic or vinyl covering becoming too hot or too cold as the fabric acts as an insulator between the infant's skin and the seat. In addition, sanitary problems are also solved because the cover can easily be removed and washed in a washing machine such that the cover can always look and smell clean.

Because of the wide variety of sizes and designs, it has been necessary to manufacture and stock a wide variety of different covers to fit the many different infant car seats which are on the market. This increases production and inventorying costs, resulting in increased costs to the consumer.

It is, therefore, a prime object of the present invention to provide a cover for use with infant car seats of a variety of different dimensions. While this is a relatively simple objective, in practice it has proved very difficult to achieve because it is necessary to have the cover adjustable in both size and shape over a large range in a number of different ways such that it can be used with infant car seats of a wide variety of different sizes and contours. In addition, the cover must fit all of the different size and shaped infant seats in a snug, neat fashion and, further, must permit easy mounting and removal of the cover from the infant car seat.

As is described below, these objectives have been achieved by utilizing a combination of three different types of size and shape altering devices, situated and interacting in such a manner that a large variety of different sized and shaped infant seats can be accommodated in an appropriate manner. While none of the individual size and shape altering means which are employed in the present invention are new, per se, the selection and proper placement of same permit the size and shape altering means to cooperate and interrelate in a manner which is not possible with any of the individual adjustment means, so as to produce a result which has heretofore been unachievable. In fact, the proper relationship between, and combination of, the alteration means achieves an unexpectedly fine functional result. This is because the alteration means cooperate to achieve better functional results than could be expected if the alteration means were employed together, in tandem, but without inter-relating in the manner described herein.

To the accomplishment of the above and to such other objects which may hereinafter appear, the present invention relates to an adjustable cover for use with infant car seats, as described in detail in the following specification and recited in the annexed claims, taken together with the accompanying drawings, wherein like numerals refer to like parts, and in which:

FIG. 1 is an isometric view of an intermediate sized infant car seat showing the front and one side thereof (in phantom) with the cover of the present invention mounted thereon;

FIG. 2 is a rear view of the seat and cover shown in FIG. 1;

FIG. 5 is a side view of the cover of the present invention;

FIG. 6 is a top cross-sectional view showing the cover of the present invention mounted on the intermediate size infant car seat illustrated in FIG. 1;

Figure 3:
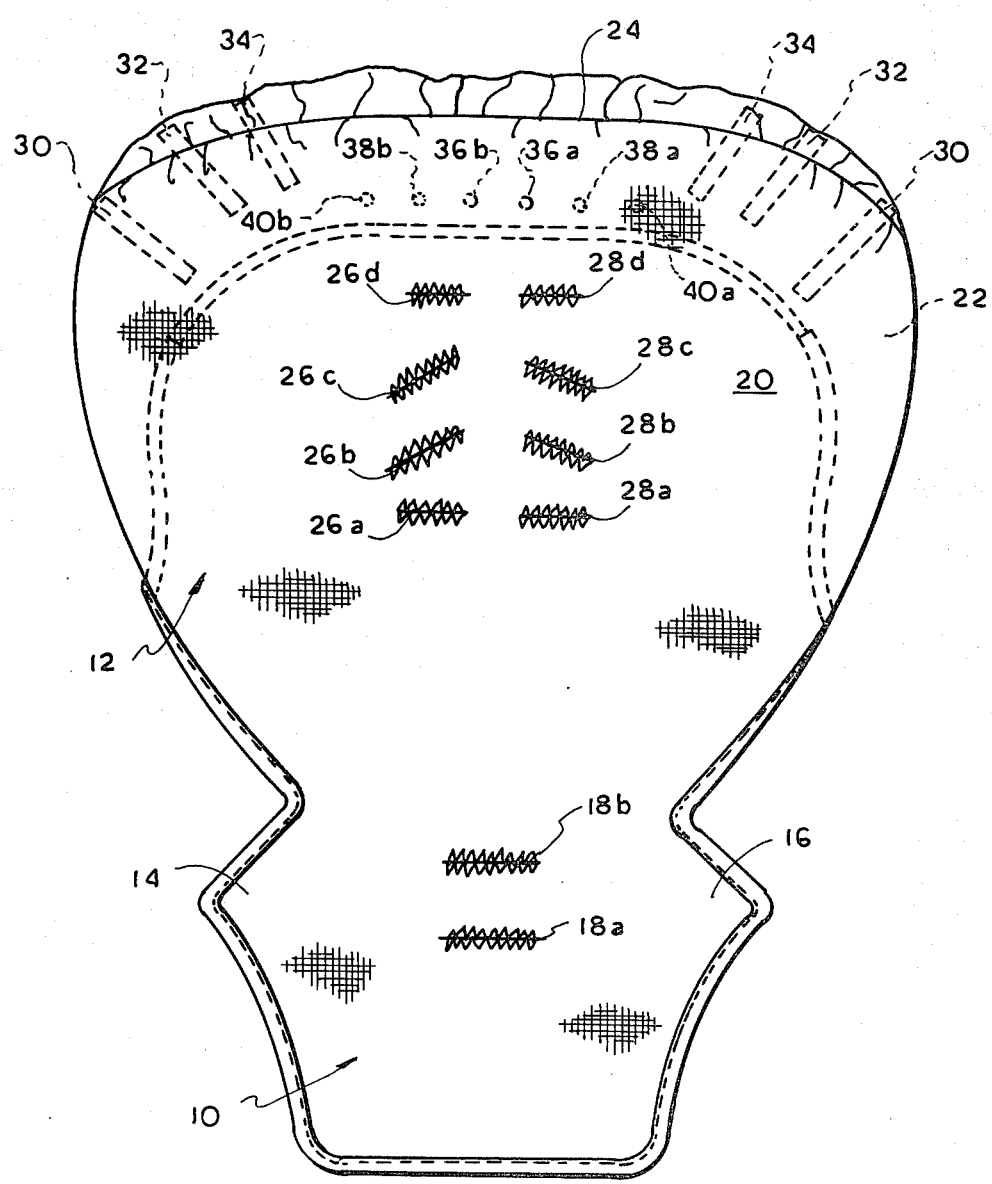
FIG. 3 is a front view of the cover of the present invention.
Figure 4:
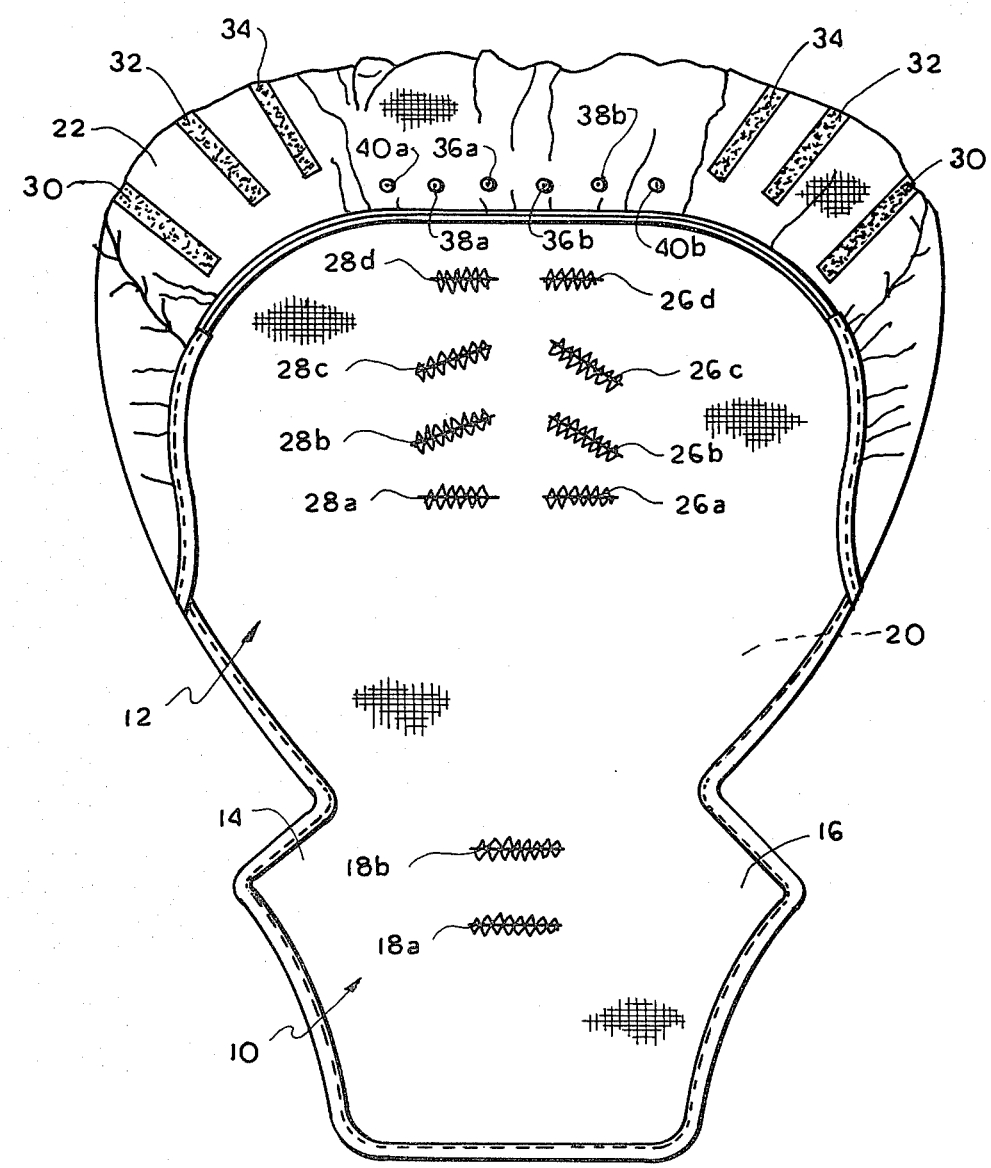
FIG. 4 is a rear view of the cover of the present invention.

As is best seen in FIGS. 3, 4 and 5, the adjustable cover of the present invention comprises a lower portion, generally designated 10, and an upper portion, generally designated 12. Lower portion 10 is designed to line the lower horizontal seat portion of the infant car seat and the upper portion 12 of the cover is designed to line the interior of the upright back portion of the infant car seat.

Lower portion 10 has a substantially rectangular central part with a pair of oppositely extending substantially triangular-shaped portions 14 and 16 extending therefrom. Portions 14 and 16 will be situated in an upstanding position adjacent the inside of the arm rests of the seat when the cover is mounted on the seat. Portion 10 is provided with a pair of belt openings 18a and 18b which will permit the belt designed to be placed between the infant's legs to extend through the cover. Two openings 18 are provided for this purpose to accommodate seats with different belt positions.

The enlarged rounded upper portion 12 consists of a front section 20 and a rear section 22, joined along a seam 24 to form a recess adapted to receive therein the upper part of the back of the infant car seat, as well as the forwardly extending sides (if present) mounted to the back. As is explained in detail below, the cover of the present invention is adjustable to permit the cover to fit a wide range of different sized and shaped infant car seats. Thus, front section 20, rear section 22 and the recess formed thereby are designed to be large enough to accommodate the back of the largest size infant seat produced. Front section 20 is provided with two rows of strap openings 26a, 26b, 26c, 26d and 28a, 28b, 28c and 28d, respectively, to accommodate a pair of shoulder straps extending from the seat. The openings 26 and 28 are situated at different locations on section 20 to accommodate a wide range of different strap positions.

Each side portion of section 22 partially defines one end of the recess and is provided with a set of three connecting strips, a "male" strip 30 and two "female" strips 32 and 34, in an outwardly directed spaced pattern. The connecting strips function to permit sections 20 and 22 to adjust the size and shape of the recess ends to the size and shape of the ends of the back of the infant seat and accommodate the contours of the forwardly extending sides of the infant car seat, if present. If no forwardly extending sides are present, the connecting strips are connected such that each side portion of section 22 folds over itself and is positioned adjacent the rear of the seat.

Strips 30, 32 and 34 permit adjustment of the effective size and shape of the recess ends, formed by sections 20 and 22, in three different modes. For the largest size infant car seat, with relatively large forwardly extending cushioned sides, none of the connecting strips 30, 32 or 34 are connected, permitting the recess ends to flare out to the fullest extent. For intermediate sized seats with smaller forwardly extending sides, connecting strips 30 and 32 at each side of the cover are respectively connected so as to reduce the size and alter the shape of the recess ends to readily accommodate the contours of the relatively smaller sides. For smaller sized car seats, which have very small or no forwardly extending sides, connecting strips 30 are connected to strips 34 so that each recess end folds over itself and is held adjacent the rear of the seat.

It should be appreciated that connecting strips 30, 32 and 34 are spaced, directed, and situated in such a manner so as not only to permit a wide range of adjustment for the recess size, but also to change the shape of the recess ends to better accommodate the contours of the intermediate and small sized car seats.

The intermediate portion of section 22 is pleated and provided with three sets of spaced interlocking snaps 36a and 36b, 38a and 38b, and 40a and 40b, respectively. Snap sets 36, 38 and 40 function to adjust the width of the recess to accommodate the widths of the backs of the various sizes of infant seats. Snap pairs 36, 38 and 40 permit the variation of the effective width of the recess in four discreet modes. For the largest sized seats, none of the snaps are connected, such that the recess accommodates the widest seat back. For intermediate sized seats, snaps 36a and 36b or 38a and 38b are connected, depending upon the pariticular width of the back of the seat. For the smallest seats, snap pair 40a and 40b are connected.

Situated along lower edge of section 22 is an elastic strip 42 which provides a multiple function. Elastic strip 42 permits rear section 22 to be expanded along the pleats to facilitate the insertion of the upper part of the back of the infant car seat into the recess during mounting. Strip 42 also acts to retain the edge of section 22 snuggly to the rear of the seat. If the seat has a cushioned back and sides, the elastic strip is situated beneath the cushioned upper back part so as to keep the lower edge of section 22 adjacent the middle of the back of the infant car seat. In addition, when the size of the recess is varied to accommodate intermediate or small sized seats through the mating of snap pairs 36, 38 or 40, elastic strip 42 maintains a tension along the edge of section 22 to retain the pleats and keep section 22 fitting snuggly along the rear of the infant car seat, regardless of the size of the seat.

It will now be appreciated that the connecting strips 30, 32 and 34, the snap pairs 36, 38 and 40, and the elastic strip 42 each contribute separate means of adjusting the effective size and shape of the recess which cooperate in a manner to permit size and shape adjustment over a large range such that the cover of the present invention is adjustable to accommodate the size and contours of a large variety of different size and shaped infant seats. This interrelationship is best appreciated with reference to FIGS. 7, 8, and 9, which illustrate the manner in which the cover of the present invention can be mounted to a larger sized car seat, FIGS. 1, 2 and 6 which illustrate the manner in which the cover of the present invention can be mounted to an intermediate sized car seat, and FIGS. 10 and 11 which illustrate the manner in which the cover of the present invention can be mounted on a small sized car seat.

Figure 7:
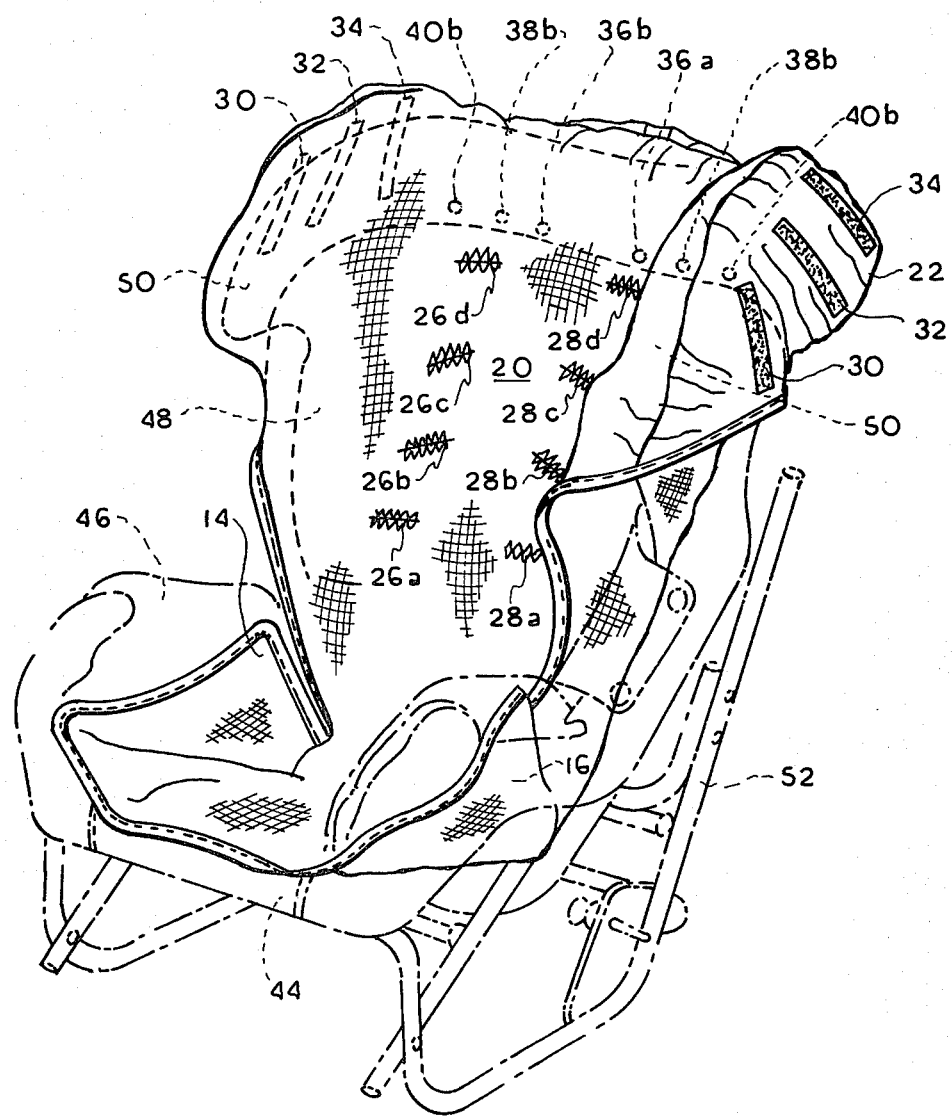
FIG. 7 is an isometric view of the front and one side of a large size infant car seat (shown in phantom) with the cover of the present invention mounted thereon.

As illustrated in FIG. 7, the larger size car seat (shown in phantom) consists of a substantially horizontal seat portion 44 with upwardly extending arm rests 46 and a substantially upstanding back portion 48, with a rounded and cushioned top and forwardly extending sides 50. Section 10 of the cover is situated to align with upper surface of seat portion 44, with triangular parts 14 and 16 lining the interiors of the arm rests 46. Front section 20 of part 12 lines the interior surface of upstanding back 48 and forwardly extending sides 50. The upper rounded portion of back 48 and sides 50 are received into the recess formed by sections 20 and 22. The seat itself is mounted on a support structure 52 composed of tubular metal sections adapted to permit the infant car seat to be fastened to the seat of the automobile in a well-known fashion.

Figure 8:
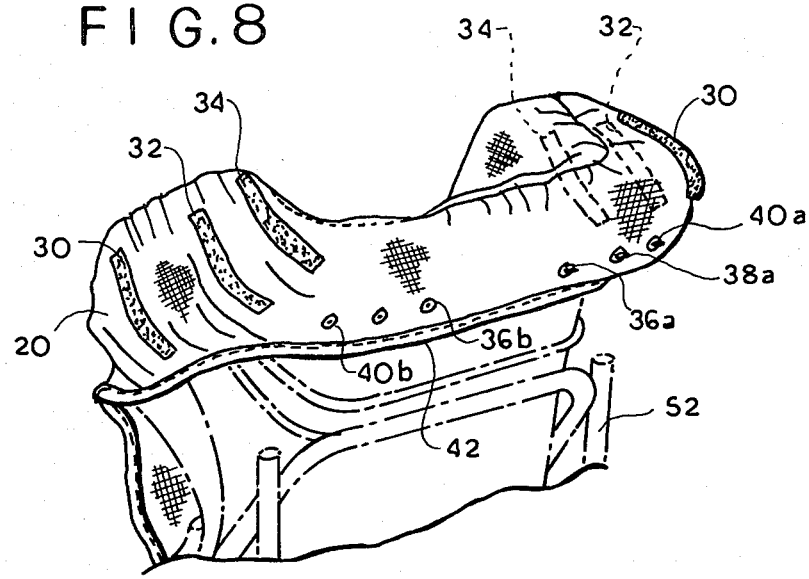
FIG. 8 is a rear view of the cover and seat illustrated in FIG. 7.
Figure 9:
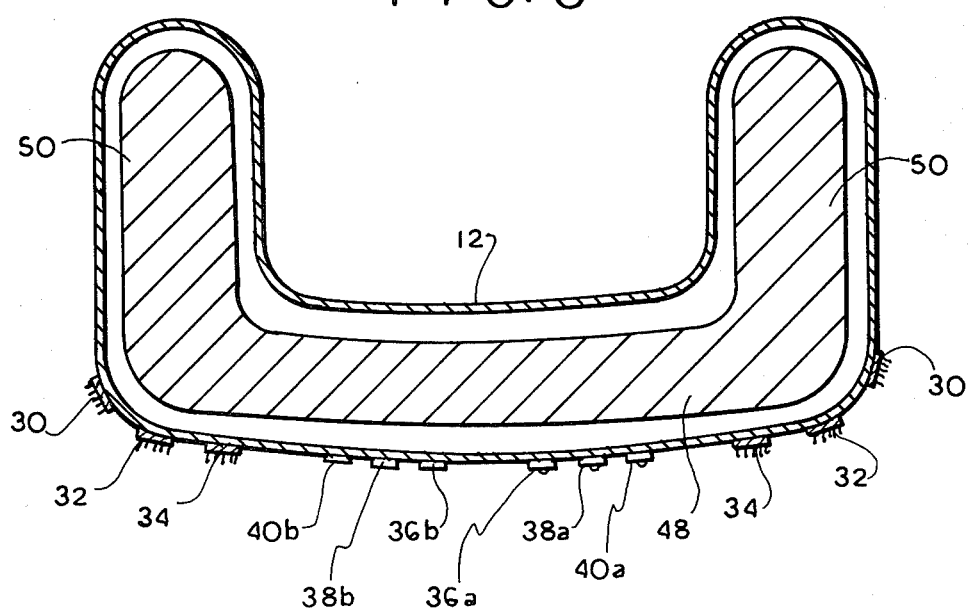
FIG. 9 is a top cross-sectional view of the cover and seat illustrated in FIG. 7.

As illustrated in FIGS. 8 and 9, when the cover of the present invention is used on a large size infant car seat, none of the strips 30, 32, 34 or snap pairs 36, 38, 40 are connected. Elastic strip 42 serves to maintain section 22 snuggly to the cushioned upper portion of the back 48 and sides 50 of the infant car seat. The expandability of the recess permits easy mounting and removal of the cover.

FIGS. 1, 2 and 6 illustrate the manner in which the cover of the present invention can be adjusted to accommodate an intermediate sized infant car seat. The infant car seat illustrated in FIG. 1 generally has the same parts as that illustrated in FIG. 7 and, therefore, the same reference numerals have been used with respect thereto, where appropriate.

The width of the back 48 of the infant car seat illustrated in FIGS. 1, 2 and 6 is considerably smaller than the back of the seat illustrated in FIGS. 7, 8 and 9. In addition, the infant car seat illustrated in FIGS. 1, 2 and 6 has no cushioning along the upper back part or forwardly extending sides. The forwardly extending sides 50' are therefore considerably smaller in size and different in contour than sides 50 illustrated in FIGS. 7, 8 and 9. As a consequence, a cover of the size and shape of the cover of the present invention, but without the adjustable feature thereof, would not fit such a seat properly as the recess formed by the front section 20 and rear section 22 would be far too large to accommodate the upper portion of the back and the sides of the intermediate sized infant seat.

In order to accommodate the intermediate sized seat, connecting strips 30 are mated with connecting strips 32 on each side of the recess to reduce the size of the recess ends and snap pair 38a and 38b is engaged to reduce the width of the recess. This is best seen from FIGS. 2 and 6. In this manner, the overall width of the recess is shortened to accommodate the shorter width back of the infant car seat and the size and shape of the portions of the recess ends, into which the forwardly extending sides 50' of the infant car seat are received, are altered to more nearly accommodate the contours thereof. Elastic strip 42 serves to gather and hold the lower edge section 22 snuggly to the back of the infant car seat. Thus, the intermediate sized infant car seat is accommodated by the adjustable cover of the present invention in a manner such that the cover fits the size and contours of the infant car seat in a neat and efficient manner without bunching out unacceptably in any one place.

Figure 10:
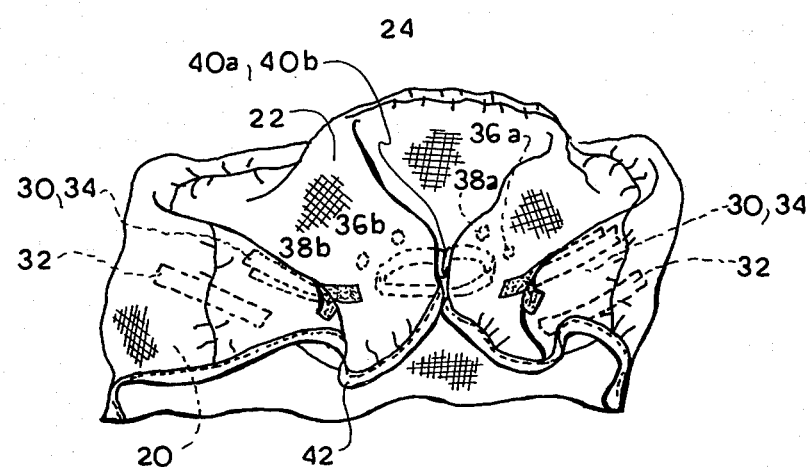
FIG. 10 is a rear view of the cover of the present invention mounted on a small sized infant seat.
Figure 11:
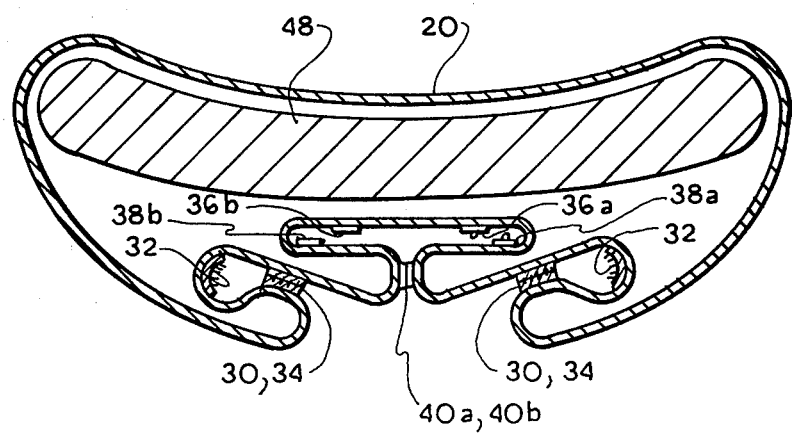
FIG. 11 is a top cross-sectional view of the seat and cover illustrated in FIG. 10.

The adjustable cover of the present invention can also be utilized on a small sized infant car seat having an upstanding back part of reduced width and with little or no forwardly extending side portions, as illustrated in FIGS. 10 and 11. The connecting means are utilized to reduce the size of the recess ends to the fullest extent and to accommodate the slightly curved seat without parallel forwardly extending sides.

In this instance, connecting strips 30 mate with the respective strips 34 such that each recess end is folded over itself, around the back of the infant car seat, and maintained in that position such that same do not puff outwardly or gather in an unacceptable or obtrusive manner, even in the absence of forwardly extending sides 50 or 50'. Snap set 40a and 40b is engaged so as to reduce the effective width of the recess to accommodate the shorter back 48 of the infant car seat. Again, elastic strip 42 serves to assure that the section 22 will snuggly adhere to the rear of the infant car seat.

It will now be appreciated that the positioning and orientation of the connecting strips and the spacing therebetween is very important to the proper functioning of the adjustable cover of the present invention. When used on an intermediate sized infant car seat, as best seen in FIG. 2, the connecting strips are situated at a position inclined with respect to the horizontal such that section 22 folds at either end of the recess, causing same to snuggly fit the forwardly extending sides. When the adjustable cover of the present invention is utilized in conjunction with the smaller infant car seat, which has very small or no forwardly extending sides, as best seen in FIG. 10, the connecting strips assume a more horizontal position such that more of the excess fabric is folded over itself and held snuggly to the rear of the infant car seat, without bunching at either side.

The snap pairs situated on the intermediate portion of section 22 fulfill the important function of cooperating with the connecting strips to provide an even wider range of adjustability. Elastic strip 42 cooperates with both the connecting strips and the snap pairs to insure that the bottom edge of section 22 does not flare out or gather unacceptably. Thus, the rear section of the cover always maintains a neat appearance and does not interfere with or obstruct the rear of the infant car seat.

The combination of all three types of adjustment means provide the wide range of size and shape adjustment necessary. Cooperation in an integrated fashion achieves the necessary size and shape adjustability while still maintaining a neat appearance and eliminating unacceptable flaring out or bunching of the cover material at any point. Due to the cooperation and interaction of the three adjustment means, a satisfactory result is obtained which, without the proper selection, positioning, orientation, interaction and cooperation between the various adjustment means would be impossible.

While only a single preferred embodiment of the present invention has been disclosed herein for purposes of illustration, it is obvious that many modifications and variations could be made thereto. It is intended to cover all of these variations and modifications which fall within the scope of the present invention, as defined by the following claims:

I claim:

1. A cover for use with infant car seats of a range of different dimensions of the type having a substantially upstanding back, the cover comprising front and rear sections joined along the top thereof to form a recess into which at least the upper part of said seat back is adapted to be received, said rear section having spaced first portions, defining, in part, the respective ends of said recess, each of said first portions including means for altering the effective size and shape of one of said recess ends, a second portion extending between said first portions in a direction across the back of the seat and including means thereon for altering the effective length of said second portion in said direction, and elastic means, situated along the edge of at least a part of said rear section, for permitting expansion of said recess and for maintaining said edge adjacent the back of said seat.

2. The cover of claim 1, wherein said second portion altering means comprises first and second spaced pairs of interengaging snap means.

3. The cover of claim 1, wherein the seat back has forwardly extending sides and wherein said recess ends are adapted to receive the sides, respectively.

4. A cover for use with infant car seats of a range of different dimensions of the type having a substantially upstanding back, the cover comprising front and rear sections joined along the top thereof to form a recess into which at least the upper portion of the seat back is adapted to be received, said rear section having spaced first portions, defining, in part, the respective ends of said recess, each of said first portions including means for altering the effective size and shape of one of said recess ends, each of said first portion altering means comprising a set of outwardly directed connecting strips, a second portion situated between said first portions and including means thereon for altering the effective length of said second portion, and elastic means, situated along the edge of at least a part of said rear section, for permitting expansion of said recess and for maintaining said edge adjacent the back of said seat.

5. The cover of claim 4, wherein said set comprises three spaced strips.

6. The cover of claim 5, wherein two of said strips are adapted to alternatively engage said third strip.

7. The cover of claim 6, wherein said second portion altering means comprises first and second spaced pairs of interengaging snap means.

* * * * *